United States Patent
Le Guen

(10) Patent No.: US 12,001,938 B2
(45) Date of Patent: Jun. 4, 2024

(54) CONVOLUTIONAL NEURAL NETWORK FOR ESTIMATING A SOLAR ENERGY PRODUCTION INDICATOR

(71) Applicant: ELECTRICITE DE FRANCE, Paris (FR)

(72) Inventor: Vincent Le Guen, Courbevoie (FR)

(73) Assignee: ELECTRICITE DE FRANCE, Paris (FR)

(*) Notice: Subject to any disclaimer, the term of this patent is extended or adjusted under 35 U.S.C. 154(b) by 819 days.

(21) Appl. No.: 16/975,892

(22) PCT Filed: Feb. 14, 2019

(86) PCT No.: PCT/EP2019/053670
§ 371 (c)(1),
(2) Date: Aug. 26, 2020

(87) PCT Pub. No.: WO2019/170384
PCT Pub. Date: Sep. 12, 2019

(65) Prior Publication Data
US 2021/0004661 A1 Jan. 7, 2021

(30) Foreign Application Priority Data
Mar. 7, 2018 (FR) ..................... 18 51971

(51) Int. Cl.
*G06N 3/044* (2023.01)
*G06N 3/045* (2023.01)
*G06N 3/08* (2023.01)

(52) U.S. Cl.
CPC ............. *G06N 3/044* (2023.01); *G06N 3/045* (2023.01); *G06N 3/08* (2013.01)

(58) Field of Classification Search
CPC ................................................ H04N 19/159
See application file for complete search history.

(56) References Cited

FOREIGN PATENT DOCUMENTS

WO   WO-2017178806 A1 * 10/2017  .......... G06T 3/4046
WO   WO-2017193172 A1 * 11/2017  ............ G01J 1/0228

OTHER PUBLICATIONS

Gensler, et al., "Deep Learning for Solar Power Forecasting—An Approach Using Autoencoder and LSTM Neural Networks," 2016 IEEE International Conference on Systems, Man, and Cybernetics. (Year: 2016).*
Yadav, et al. "Solar radiation prediction using Artificial Neural Network techniques: A review," Elsevier, 2013. (Year: 2013).*
Villegas, et al., "Decomposing Motion and Content for Natural Video Sequence Prediction," ICLR 2017. (Year: 2017).*

(Continued)

*Primary Examiner* — Feng-Tzer Tzeng
(74) *Attorney, Agent, or Firm* — Faegre Drinker Biddle & Reath LLP

(57) ABSTRACT

A method for estimating at least one energy production indicator of a solar energy production system, comprising: reception of at least one image obtained from a wide-angle image capture device, processing of said obtained image by at least one convolutional neural network comprising at least two layers respectively for the application of a convolution filter to the obtained image and for the estimation of an energy production indicator.

14 Claims, 4 Drawing Sheets

(56) References Cited

OTHER PUBLICATIONS

Van O'Shea, et al., "An Introduction to Convolutional Neural Networks," 2015 (Year: 2015).*

Gensler, et al., "Deep Learning for Solar Power Forecasting—An Approach Using Autoencoder and LSTM Neural Networks," 2016 IEEE International Conference on Systems, Man, and Cybernetics. (attached in the previous Office action) (Year: 2016).*

Villegas, et al., "Decomposing Motion and Content for Natural Video Sequence Prediction," ICLR 2017. (attached in the previous Office action) (Year: 2017).*

Van O'Shea, et al., "An Introduction to Convolutional Neural Networks," 2015. (attached in the previous Office action) (Year: 2015).*

Gensler et al., "Deep Learning for Solar Power Forecasting—An Approach Using Autoencoder and LSTM Neural Networks," 2016 IEEE International Conference on Systems, Man, and Cybernetics (SMC 2016), Budapest, Hungary, EEE, Oct. 9, 2016, pp. 2858-2865.

Inman et al., "Solar forecasting methods for renewable energy integration," Progress in Energy and Combustion Science, Jul. 26, 2013, vol. 39, No. 6, pp. 535-576.

Mehta et al., "DeepSolarEye: Power Loss Prediction and Weakly Supervised Soiling Localization via Fully Convolutional Networks for Solar Panels," ArXiv.org, Cornell University Library, Ithaca, NY, US, Oct. 10, 2017, pp. 1-10.

Richardson, Jr. et al., "Machine Learning versus Ray-Tracing to Forecast Irradiance for an Edge-Computing SkyImager," 2017 19th International Conference on Intelligent System Application to Power Systems (ISAP), IEEE, Sep. 17, 2017, pp. 1-6.

Anonymous, "Convolutional Neural Network," Wikipedia, Jan. 20, 2018, retrieved from: https:fr.wikipedia.org/w/index.pdhp?title=Reseau_neuronal_convolutif&oldid=144657712 on Mar. 25, 2024, with machine generated English language translation, 30 pages.

Onyshi et al., "Deep Convolutional Neural Network for Cloud Coverage Estimation from Snapshot Camera Images," SOLA, vol. 13 (0), Jan. 1, 2017, pp. 235-239, retrieved from: https://www.jstage.jst.go.jp/article/sola/13/0/13_2017-043/_pdf on Mar. 22, 2024.

Examination Report issued in related application EP 19703758.3 Apr. 2, 2024, with machine generated English language translation, 22 pages.

* cited by examiner

*MES = MEASURE; APP = LEARNING

CONVOLUTIONAL NEURAL NETWORK FOR ESTIMATING A SOLAR ENERGY PRODUCTION INDICATOR

CROSS-REFERENCE TO RELATED APPLICATIONS

This application is the U.S. national phase of the International Patent Application No. PCT/EP2019/053670, filed Feb. 14, 2019, which claims the benefit of French Patent Application No. 18 51971, filed Mar. 7, 2018, the entire content of which is incorporated herein by reference.

FIELD

The present disclosure relates to the field of short-term estimation or prediction of the production of electrical energy by photovoltaic cells.

In particular, the disclosure relates to the estimation of current and/or future solar radiation that can be used for the production of energy and more particularly to the estimation of radiation parameters and/or the prediction of their evolution by analysis of cloud cover images (cloudiness, which influences the usable radiation).

BACKGROUND

Due to the growing share of photovoltaic production, the question arises of large-scale integration of this intermittent energy source into existing electricity networks.

An improved estimate of photovoltaic production represents an advantage for the producer and for the network operator in ensuring the balance between consumption and production, which guarantees the safety and stability of the electricity system.

In particular, these estimates or predictions make it possible to optimize the operation of mixed systems combining photovoltaic production and storage systems (batteries) or other means of production (for example, anticipating or detecting a drop in production makes it possible to engage the batteries appropriately).

Estimation of the solar radiation flux is generally carried out by a device comprising a pyranometer type of sensor. Such a sensor is relatively expensive and in addition is unsuitable for prediction.

It may therefore be replaced by a camera with wide-angle optics, also called "fisheye", which provides a hemispherical panoramic view)(360°).

The estimation at a time t0 can be made based on a single captured image.

The estimation of irradiance parameters at a future time (prediction) may require capturing a plurality of images.

In the known methods of the prior art, this plurality of images is preprocessed in order to calculate parameters characteristic of the evolution of the cloudiness. The data thus obtained are then processed to obtain the target parameters. The processing may in particular be carried out by a neural network.

To be usable by these methods, the captured image (or images), which is distorted (hemispherical image projected onto a two-dimensional plane corresponding to the plane of the sensor) must first be corrected (transformation in order to go to an orthonormal two-dimensional frame of reference). Such a correction requires prior calibration of the image capture device using a test pattern, this calibration preferably being carried out on location where the sensor is used.

This is the case, for example, in the solution proposed by the document "*Surface solar irradiance estimation with low-cost fish-eye camera*", Charlotte Gauchet et al, "Remote Sensing Measurements for Renewable Energy" workshop, May 2012, Risoe, Denmark. This publication presents different steps necessary to establish the relationship between the captured images and the irradiance parameters:
  Geometric and radiometric calibration of a fisheye camera;
  Segmentation of the pixels of the images into five classes: clear sky, dark clouds, bright clouds, center of the sun, perisolar region known as circumsolar;
  Determination of regression models for estimation of the global, direct and diffuse solar radiation based on the segmentation of hemispherical images of the sky.

In the document "*Sun-Tracking imaging System for intra-hour DNI forecasts*", Chu Li, Coimbra, Renewable Energy, 2016, it is proposed to use fisheye images and MLP "Multi-Layer Perception". However, the input data are indicators extracted from the images, and there is therefore a preprocessing of the images and a phase of indicators being defined by an expert.

SUMMARY

The present disclosure improves the situation.

A first aspect of the disclosure relates to a method for estimating at least one energy production indicator of a solar energy production system, comprising:
  reception of at least one image obtained from a wide-angle image capture device,
  processing of the obtained image by at least one convolutional neural network comprising at least two layers respectively for the application of a convolution filter to the received image and for the estimation of an energy production indicator.

Processing by a convolutional network advantageously makes it possible to eliminate a prior step of calibrating the image capture device or of transforming the image obtained by the device.

According to one embodiment, the obtained image may be captured by the wide-angle image capture device at a time t and the energy production indicator may be estimated at the time t corresponding to the time of capture of the obtained image.

The method according to this embodiment thus allows real-time estimation of the energy production indicator.

According to one embodiment, a series of images may be obtained from the wide-angle image capture device, the images of the series may be processed sequentially by a recurrent convolutional neural network, and the energy production indicator may be predicted for a time t subsequent to the capture of the series of images.

The method according to this embodiment thus allows the estimation (or prediction) of future energy production indicators, which can advantageously make it possible to optimize the distribution of electrical energy in a network, for example.

In addition, the convolutional neural network may be a recurrent convolutional neural network, the images of the series may be processed in a first processing by the recurrent convolutional neural network in order to obtain a context vector, the context vector being subjected to a second processing by a recurrent non-convolutional neural network in order to obtain the energy production indicator. The application of the convolution filter may be implemented in the recurrent convolutional neural network and the estimation of the energy production indicator may be implemented in the recurrent non-convolutional neural network.

Such an embodiment allows a precise estimation of the evolution of the solar energy production indicator.

Additionally or alternatively, the recurrent convolutional neural network may be of the Long Short-Term Memory type, LSTM.

The recurrent convolutional neural network is also called an encoder network in an encoder/decoder type of architecture.

Additionally or alternatively, the recurrent non-convolutional neural network may be of the Long Short-Term Memory type, LSTM.

The recurrent non-convolutional neural network is also called a decoder network in an encoder/decoder type of architecture.

According to one embodiment, the image obtained from the wide-angle image capture device may be obtained by:
capture of a series of images by the wide-angle image sensor; and
application of an optical flow algorithm to the captured series of images in order to predict said obtained image, the obtained image corresponding to a time t subsequent to the captured series of images.

Thus, the prediction of the future image can be carried out upstream of the estimation device, which can therefore be used both on directly captured images or on predicted images.

According to one embodiment, the image obtained from the wide-angle image capture device may be obtained by:
capture of a series of images by the wide-angle image capture device; and
processing of the series of images by another convolutional neural network in order to predict said obtained image, the obtained image corresponding to a time t subsequent to the captured series of images.

Thus, the prediction of the future image can be carried out upstream of the estimation device, which can therefore be used both on directly captured images or on predicted images.

According to one embodiment, the processing by the convolutional neural network comprises at least:
a first layer for the application of convolution filters; and
a second layer for downsampling the output from the first layer.

The first layer makes it possible to duplicate the image as many times as there are feature maps, and the second layer makes it possible to reduce the size of these maps.

In addition, the processing by the convolutional neural network may comprise several pairs of successive first and second layers.

Having multiple pairs makes it possible to capture shapes at different levels of granularity.

Additionally or alternatively, the layer for estimating the energy production indicator may comprise processing by a neuron followed by application of a linear activation function.

According to one embodiment, at least one energy production indicator may comprise one of, or a combination of:
a global horizontal irradiance parameter;
a diffuse horizontal irradiance parameter; or
a direct normal irradiance parameter.

These parameters are representative of solar energy production and are therefore relevant for taking them into account.

A second aspect of the disclosure relates to a computer program comprising a series of instructions which, when they are executed by a processor, implement the steps of a method according to the first aspect of the disclosure.

A third aspect of the disclosure relates to a device for estimating at least one energy production indicator of a solar energy production system, comprising:
a reception interface for receiving at least one image obtained from a wide-angle image capture device,
a processor configured for the processing of said captured image by at least one convolutional neural network comprising at least two layers respectively for the application of a convolution filter to said received image and for the estimation of an energy production indicator.

A fourth aspect of the disclosure relates to a system comprising a wide-angle image capture device capable of communicating with an estimation device according to the third aspect of the disclosure.

BRIEF DESCRIPTION OF THE DRAWINGS

Other features and advantages of the disclosure will become apparent upon examining the following detailed description, and the appended drawings in which.

DETAILED DESCRIPTION

Figure 1:
FIG. 1 shows a system according to an embodiment.

FIG. 1 illustrates a system for estimating at least one energy production indicator of a solar energy production system according an embodiment.

The estimation system may preferably be located close to the solar energy production system. The solar energy production system is not represented in FIG. 1.

The system comprises a wide-angle image capture device 100, such as a fisheye camera for example.

Each image captured by the capture device 100 may be transmitted to an estimation device 102 according to one embodiment, or, according to other embodiments, to an optional prediction device 101 which itself is connected to the estimation device 102.

Whether the estimation device 102 receives one or more images directly from the capture device 100 or from the prediction device, the received image or images are considered to be obtained from the capture device 100.

The estimation device 102 is configured to implement a method according to an embodiment, as described in more detail below.

The embodiment is based on the use of a wide-angle image capture device in combination with an estimation device integrating a convolutional-type deep neural network, also called CNN for "convolutional neural network".

The capture device 100 may be fixed or mobile and may capture images at a given frequency or when triggered. For example, the capture device 100 may capture images every ten seconds. No restriction is placed on the frequency of the image capture.

A CNN-type network may comprise a first processing layer, or convolution layer, which makes it possible to process the image obtained from the capture device 100 or from the prediction device 101. The convolution layer can process the image obtained, by group of pixels.

The CNN-type network may comprise several processing (convolution) layers, and further comprises a layer responsible for extracting an estimate of at least one solar energy production indicator, such as an estimate of solar radiation.

The indicator may be:
- a parameter representative of the electricity production from the energy production device such as a solar panel placed on the ground near the estimation system;
- a parameter representative of the solar irradiance in Watt/m$^2$, which can be broken down into three components:
  - global horizontal irradiance or GHI;
  - diffuse horizontal irradiance or DHI;
  - direct normal irradiance or DNI;
- a parameter relating to any other meteorological variable that can be deduced from images, such as cloud cover, weather, etc.

In parallel, in order to evaluate the precision of the estimation device and in order to carry out the learning phase of the convolutional neural network, provision may be made for measuring solar radiation, in parallel and at the same time increment (at the same frequency as an image capture frequency), by means of a radiation sensor, such as a sun tracker (Solys2™ for example), or a pyranometer (SPN1 for example).

The use of a CNN-type network eliminates the need for calibration of the capture device as well as the need for transforming the digital image obtained from the capture device.

Figure 2:
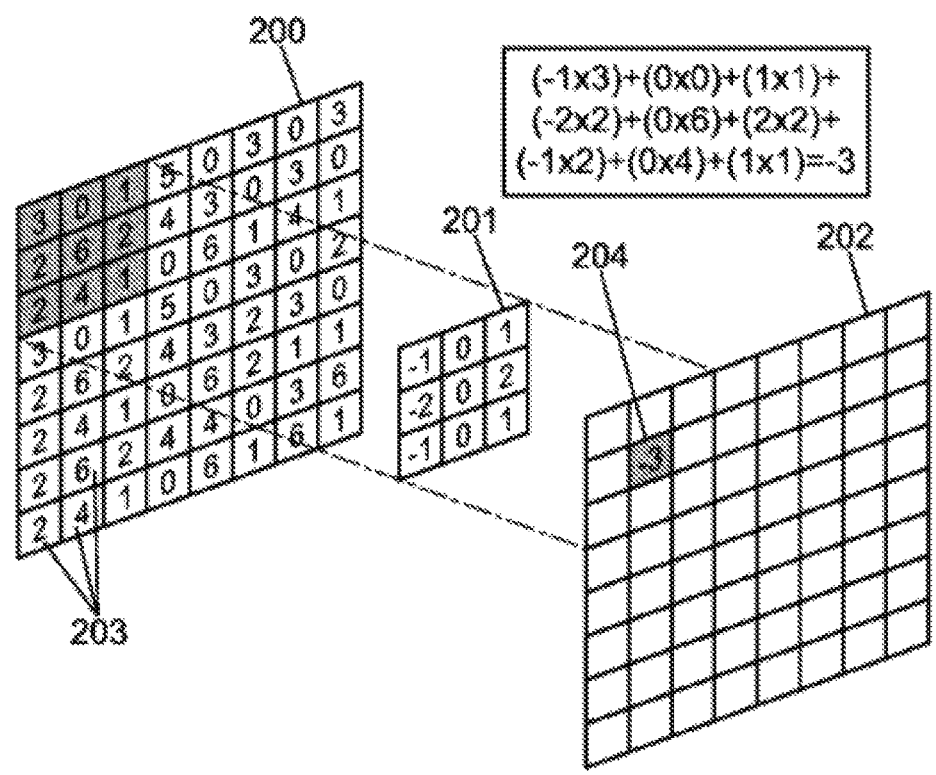
FIG. 2 shows a convolution layer applied to an image according to an embodiment.

FIG. 2 illustrates the principle of convolution and shows the result of applying a convolution filter 201 to an image 200 comprising pixels 203.

The image 200 shown has a size of 8*8=64 pixels and may be the image obtained from the capture device 100.

The convolution filter 201 is 3*3 in size and is therefore applied to each matrix of 3*3 pixels of the image 200 in order to calculate a resulting pixel 204 of the resulting image 202.

Several convolution filters may be applied to an image in order to duplicate the image in several feature maps.

Figure 3:
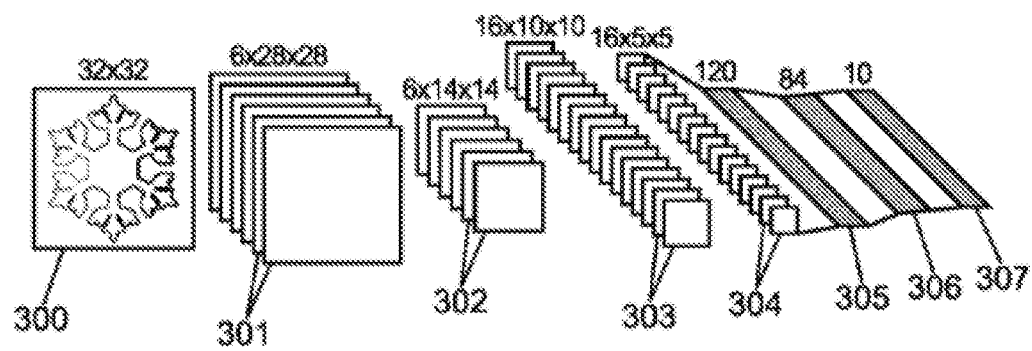
FIG. 3 illustrates the different layers of a convolutional neural network according to an embodiment.

FIG. 3 illustrates the various sub-steps corresponding to a step of applying a convolutional neural network to an image.

In particular, a convolutional network of the LeNet-5 type generally used in the recognition of digits in images (digits from 0 to 9, hence the ten neurons in the last layer) is illustrated in order to present the general principle of a convolutional neural network.

Such images of digits here have an input size of 32*32 pixels (black and white images).

Convolution filters of 5*5 pixels in size are applied in order to obtain a series of feature maps, for example 6 feature maps, 28*28 pixels in size after the first convolution layer 301.

Thus, in such an example there are 6*28*28 neurons in the first convolution layer and 6*5*5 weights to learn. To this end, the convolutional neural network can be constructed by learning from processing a set of images and by comparison with the data obtained by the radiation sensor or by the pyranometer, during a prior step not further described below.

A downsampling sub-step, or downsampling layer, called "max pooling", may be applied to the feature maps 301 in order to reduce the size of the image. In the example of FIG. 3, the size of the feature maps 301 is divided by 2 in order to obtain downsampled maps 302 of 14*14 pixels.

Each pixel of a downsampled map 302 can be calculated as the sum or the maximum (or any function) of the 2*2=4 corresponding pixels in the feature map 301 from which it is derived, the sum or the maximum being multiplied by a weight determined during the learning phase.

Non-linear activation functions may be introduced between the layers, for example after each convolution layer. An example of a non-linear function may be a "REctified Linear Unit" (RELU) type of function.

Several pairs of convolution and downsampling layers may be used, as shown in FIG. 3, in which an additional convolution layer is applied to the downsampled maps 302 in order to obtain 16 feature maps 10*10 pixels in size, which in turn are downsampled in order to obtain 16 downsampled maps 5*5 pixels in size.

The chaining of several pairs of convolution and downsampling layers makes it possible to capture shapes at different levels of granularity, translation-invariant.

After the pair or pairs of convolution and downsampling layers, there may be added so-called "fully connected" layers, which are used in neural networks. A fully connected layer is a layer where each neuron is connected to all neurons in the previous layer. A convolution layer therefore does not belong to this type of layer.

FIG. 3 shows a first fully connected layer making it possible to obtain 120 values, then a second fully connected layer making it possible to obtain 84 values, and finally a third fully connected layer making it possible to obtain 10 values which are the ten outputs of the convolutional neural network (and which indicate, in the example considered, the recognition or non-recognition of a given number). The fully connected layers make it possible to relate the captured shapes to the information that we wish to predict with the convolutional neural network.

In a convolutional neural network, a succession of several convolution layers, followed by non-linear activation functions, makes it possible to gradually construct an increasingly abstract representation of the input data. As an example, if the convolutional neural network takes a car image as input, the first convolution layer can enable detecting lines or edges. Then these elements are combined together by the following layers and one layer will detect the more abstract concept of a wheel, and the last layer will identify the concept of a car.

The principle of a convolutional neural network illustrated in FIG. 3 may advantageously be used in a context of estimating an energy production indicator. In this case, the last "fully connected" layer returns a single value and is a layer for estimating an energy production indicator.

Prior to the statistical learning phase, images are captured and the corresponding radiation measurements captured by the radiation sensor or the pyranometer are stored in parallel.

As described above, the use of a convolutional neural network makes it possible to dispense with prerequisites such as calibration of the camera and preprocessing such as the definition of indicators, segmentation of the images, in comparison to existing methods that do not use a convolutional neural network.

Figure 4:
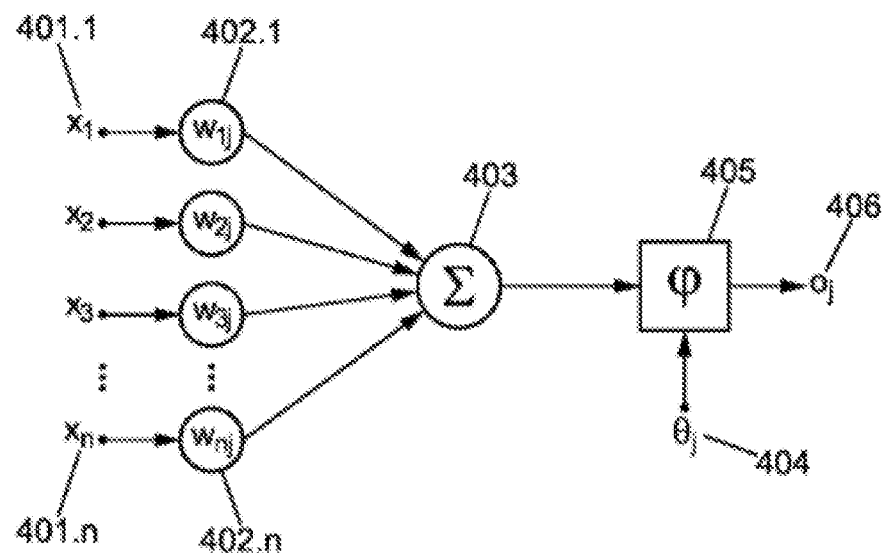
FIG. 4 illustrates the operation of a neuron of a neural network according to an embodiment.

FIG. 4 illustrates a neuron of a processing layer of a neural network.

A neural network is generally composed of a succession of layers, each of them taking the outputs of the previous layer as inputs.

Each layer i is composed of $N_i$ neurons, taking their inputs from the neurons of the preceding layer i−1. A neuron calculates a weighted sum of its inputs and then applies a non-linear activation function, such as a sigmoid function or a hyperbolic tangent, in order to obtain an output value. The weights of the weightings constitute parameters optimized during the learning phase.

In FIG. 4, the illustrated neuron applies weights 402.1-402.$n$ to the respective input values 401.1-401.$n$. The weighted values are then subjected to a combination function 403.

A non-linear activation function 405 is then applied as a function of a threshold value 404 in order to obtain the output value 406 of the neuron.

The principle of a convolutional neural network is to apply transformations to an image while taking its two-dimensional structure into account by means of convolution filters.

For example, a convolution filter 3*3 pixels in size applied to an image smoothes the image by transforming each pixel by a linear combination of the values of its neighbors. The same filter is applied to the entire image, moving within the image from left to right and from top to bottom for example, to calculate the output values.

According to an embodiment, the choice of architecture of the convolutional neural network may be made:
- manually: a number of convolution layers, a number of filters per layer, the activation functions, the regularization and normalization methods are determined. No restriction is placed on the determined architecture which depends on the fixed specifications and the degree of precision desired;
- using an already existing architecture, by transposing it to the estimation of an energy production indicator (transfer learning). High-performance neural network architectures are known, can include millions of training parameters, can include up to 150 layers (for the ResNet network for example), and can be trained for several weeks on graphics processing units, or GPU. Such pre-trained networks can thus be put to good use in estimating a solar energy production indicator.

One embodiment may provide for the use of a ResNet type network whose parameters are trained on a training database (images obtained by a wide-angle image device in association with measurements of an energy production indicator, in particular irradiance). Such a network may comprise up to 152 layers and more than 60 million parameters to be optimized. For example, an embodiment has been implemented in a ResNet type of network with 51 layers and comprising more than 23 million parameters.

Figure 5:
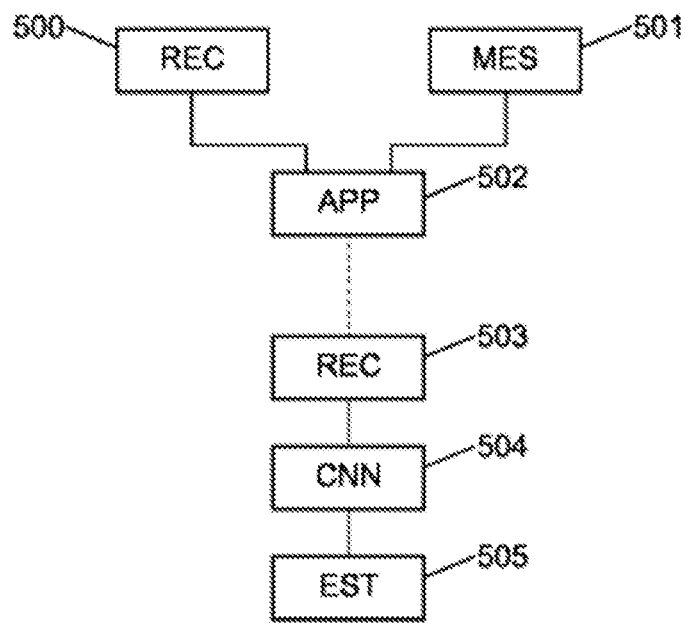
FIG. 5 is a diagram illustrating the steps of an estimation method according to an embodiment.

FIG. 5 is a diagram illustrating the steps of a method for estimating at least one solar energy production indicator according to several embodiments.

Steps 500 to 502, enabling the learning of the recurrent neural network, precede steps 503 to 505.

In a step 500, a series of images is captured. Such a series of images may be captured by a single image capture device or by a plurality. In parallel with the capture of the images, measurements of the solar energy production indicator (or indicators) to be evaluated are carried out in a step 501. Each measurement corresponds temporally to the capture of one of the images of step 500.

In a step 502, the parameters of the convolutional neural network are determined by learning from the data acquired in steps 500 and 501, and in order to determine one or more solar energy production indicators. As described above, the convolutional neural network may be defined manually or may make use of an already existing architecture.

Once the learning phase is complete, the convolutional neural network whose parameters have been determined can be used to determine the solar energy production indicator.

To this end, in a step 503, the estimation device 102 receives an image obtained from the wide-angle image capture device.

In a step 504, the image obtained is processed by the convolutional neural network resulting from steps 500 to 502, in order to obtain, in a step 505, the energy production indicator.

Steps 503 to 505 cover several embodiments, depending on whether the energy production indicator is an actual (present) value or a value predicted for a future moment.

According to a first embodiment, the obtained image is captured by the wide-angle image capture device 100 at a time t and the image is processed by the convolutional neural network in order to estimate the energy production indicator at time t, corresponding to the time of capture of the obtained image.

Thus, in this first embodiment, the method estimates the indicator corresponding to a single image. The indicator is therefore representative of solar radiation at the time of capture of this image.

According to a second embodiment, a series of images is obtained from the wide-angle image capture device 100, the images of the series being processed sequentially by a recurrent convolutional neural network. In this case, the energy production indicator can be predicted for a time t (strictly) subsequent to the capture of the series of images.

The use of a series of images, captured at different times, makes it possible to take into account the temporal aspect of the evolution of the radiation (for example movement of the cloud layer).

The disclosure proposes the use of a recurrent type of convolutional neural network for processing a series of images.

Just as convolutional networks are designed as a specialization in image processing, recurrent networks are a specialization in the processing of sequential data.

The principle of a recurrent network is to enable storing in memory the order in which the examples (the images in the context of an embodiment) are input to the network during the learning phase, in particular during step 502 discussed above. Thus, during the learning phase, a recurrent network does not take examples independent of one another as input, but series or sequences of examples, a sequence of examples being for example numbered from 1 to T (x1, x2, . . . xT).

Figure 6:
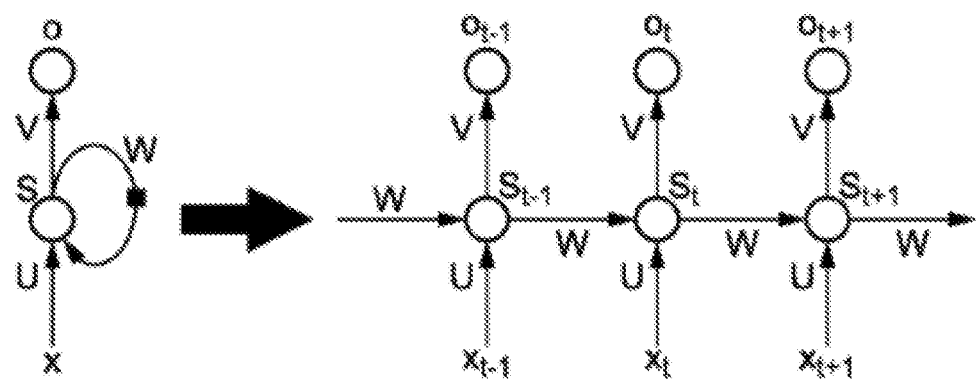
FIG. 6 schematically illustrates the principle of a recurrent network.

FIG. 6 schematically illustrates the principle of a recurrent network.

The network comprises an input layer with a vector x describing each example, and cycles are introduced in the connections between the neurons s. The output from the network is denoted o.

The loop W which makes the network recurrent is indicated in the right portion of FIG. 6.

Examples in a sequence $x_{t-1}, x_t, x_{t+1}$, are presented one by one in their numerical order, the s values s of the neurons then constituting a current state of the neural network. Thus, the output $o_t$ of the network for neuron $s_t$ does not depend only on the input vector $x_t$, but also on the state of the network at time t−1, therefore on that of all preceding times.

A variant of the so-called "simple" recurrent networks as described with reference to FIG. 6, is the LSTM network (for "Long Short-Term Memory").

An LSTM block or cell is composed of a state, an input gate, an output gate, and a forget gate. The state vector at time t represents the current state of the sequence of examples while knowing the past states, hence the name "memory". The evolution of this memory is regulated by the three gates, represented by weights to be learned. LSTM networks were originally developed to address the learning problems ("vanishing gradients") of "simple" recurrent networks when they are applied to long sequences. The processing of a series of images according to an embodiment may involve the architecture represented with reference to FIG. 7.

Such an architecture can be called an encoder/decoder (or, in the literature, "sequence to sequence" which is used in particular in applications of translating text from one language to another).

Figure 7:
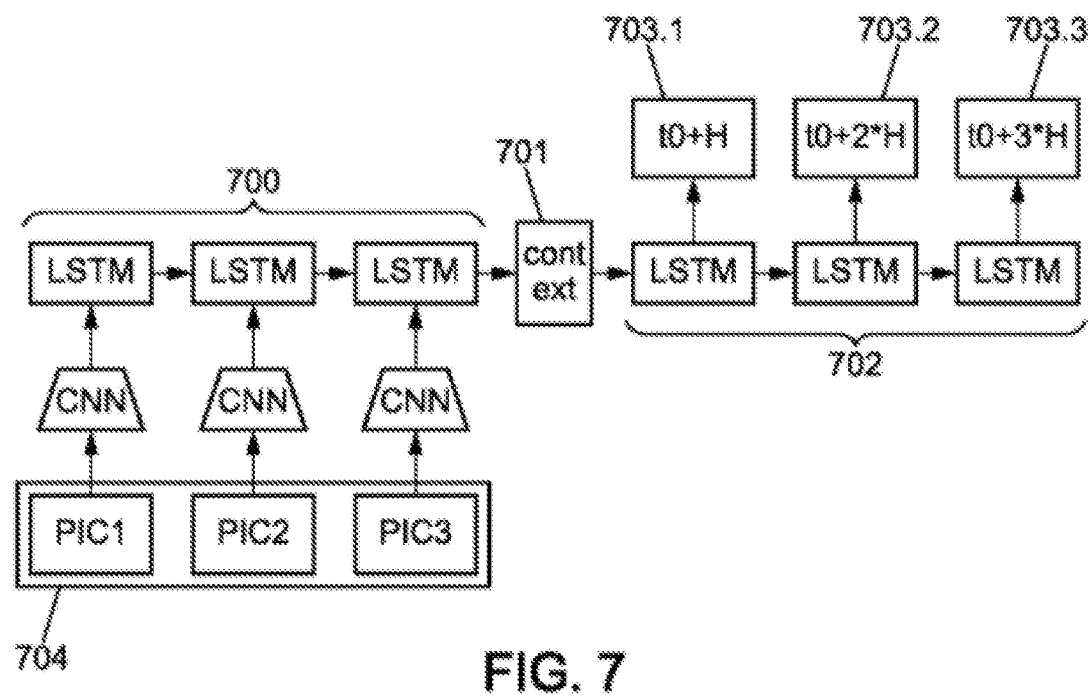
FIG. 7 illustrates a set of neural networks for predicting an indicator of solar energy production according to an embodiment.

The architecture has a first recurrent convolutional neural network 700 of the LSTM type which takes as input a series of images 704 captured at different times, and processes each of them by a convolutional network (CNN in FIG. 7). Information from the convolutional neural networks CNN is entered into an LSTM-type recurrent network. At the end of the LSTM sequence, the state vector of the LSTM network, or context vector, denoted 701, is the representation of what the first recurrent convolutional network 700 has learned from the series of images (for example a vector describing the manner in which the clouds move).

The general principle of the operation of an LSTM network is known and will not be described further in the present application.

The first recurrent (convolutional) network 700 can thus be called an encoder recurrent network.

The context vector 701 is used as input to a second recurrent, non-convolutional network 702, called the decoder recurrent network. The decoder recurrent network 702 uses the context vector 701 to estimate the indicators of solar energy production at future time increments $t_0+H$, $t_0+2H$ and $t_0+3H$ for example, to being the time of capture of the series of images 704.

According to a third embodiment which is intended, as with the second embodiment, for estimating a future value of the indicator, the following steps are implemented:
  capture of a series of images by the wide-angle image sensor 200; and
  application of an optical flow algorithm to the captured series of images, by the prediction device 101 illustrated with reference to FIG. 1, in order to determine a future image corresponding to a time t0 subsequent to the capture of the series of images. The future image is then transmitted to the estimation device 102 for estimation of the solar energy production indicator at time $t_0$.

Such a method thus consists of calculating the optical flow between successive images (for example, estimation of the movement of the clouds) and propagation of this movement in order to predict a future image at $t_0+H$, to corresponding to the capture of the series of images. The estimation device 102 then applies the method presented above to the future image in order to obtain the estimation of the solar energy production indicator.

According to a fourth embodiment which is intended, as with the second embodiment and third embodiment, for estimating a future value of the indicator, the following steps are implemented:
  capture of a series of images by the wide-angle image capture device 200; and
  processing of the series of images by another convolutional neural network (not represented in the figures and which may be implemented in the prediction device 101 of FIG. 1) in order to determine a future image corresponding to a time t0 subsequent to the capture of the series of images. The future image is then transmitted to the estimation device 102 for estimation of the solar energy production indicator at time $t_0$.

Thus, according to this fourth embodiment, instead of calculating the optical flow in order to predict one or more future images, it is possible to use neural networks which directly predict the future image or images. This is the same neural network architecture as presented above, except that the outputs are the future images (not the indicator(s)). The device 102 then processes the future images as described above.

Figure 8:
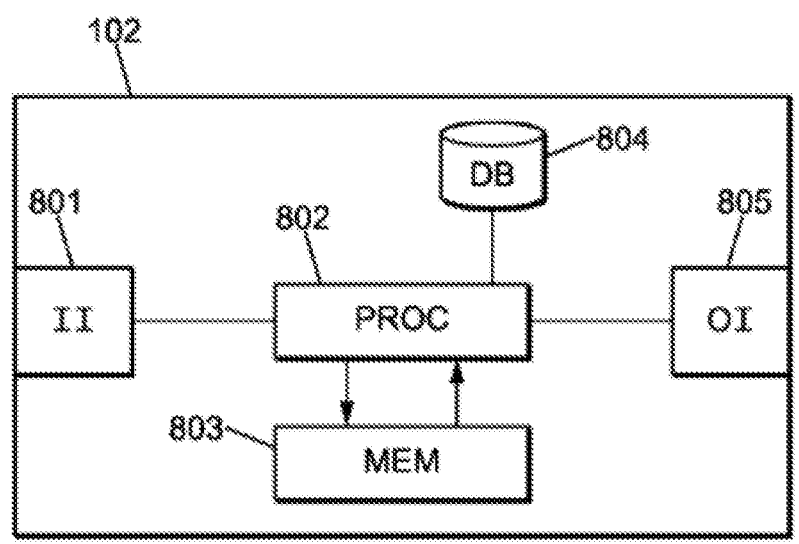
FIG. 8 illustrates the structure of an estimation device according to an embodiment.

FIG. 8 illustrates the structure of the estimation device 102 according to one embodiment.

The estimation device 102 comprises a random access memory 803 and a processor 802 for storing instructions enabling the implementation of steps 503 to 505 of the method described above. The device optionally also comprises a database 804 for storing data intended to be kept after the application of the method. The database 804 may also store the neural network or networks, recurrent and non-recurrent, as well as their respective parameters.

The estimation device 102 further comprises an input interface 801 intended for receiving the images from the prediction device 101 or from the wide-angle image capture device 100, and an output interface 805 capable of providing the solar energy production indicator as output.

The method according to an embodiment has been implemented in a Resnet type of network with parameters pre-learned on the ImageNet base, the last layers having been modified to carry out the estimation of the solar radiation.

The network used takes as input a color image of size 224*224*3 (the images from the camera are centered and redimensioned to this size). Indeed, three channels are used to represent the color image: red, green and blue. A first block called ResnetConv comprises a Resnet network and all the convolution layers. As the last layers of the Resnet network are used to conduct a classification between 1000 object classes, they have been removed in an embodiment in order to add in their place layers for doing the regression of the radiation, namely:
  a so-called "dropout" layer which is a regularization which consists of setting the input neurons to 0 with a probability of 0.5;
  a fully connected layer of ten neurons followed by a ReLU activation function;
  a fully connected layer with one neuron followed by a linear activation function, which outputs the radiation indicator.

This network was trained on a history of several million images and radiation measurements at an experimental site between 2012 and 2015. The validation database consists of images from the year 2016 at the same site.

The results obtained show a strong reduction in the error between the estimates and the measurements compared to the methods of the prior art.

The invention claimed is:

1. A method for estimating at least one energy production indicator of a solar energy production system of the photovoltaic cell type, comprising:
   reception of at least one image obtained from a wide-angle image capture device, the obtained image being a hemispherical image of the sky,
   processing of said obtained image by at least one convolutional neural network comprising at least two layers respectively for the application of a convolution filter to said obtained image and for the estimation of an energy production indicator;
   wherein a series of images is obtained from the wide-angle image capture device;
   wherein the images of the series are processed in a first processing by a recurrent convolutional neural network in order to obtain a context vector, said context vector being subjected to a second processing by a recurrent non-convolutional neural network in order to obtain the energy production indicator; and
   wherein the application of the convolution filter is implemented in the recurrent convolutional neural network and the estimation of the energy production indicator is implemented in the recurrent non-convolutional neural network.

2. The method according to claim 1, wherein the obtained image is captured by the wide-angle image capture device at a time t and wherein the energy production indicator is estimated at the time t corresponding to the time of capture of the obtained image.

3. The method according to claim 1, wherein the images of the series are processed sequentially by the recurrent convolutional neural network, and wherein the energy production indicator is predicted for a time t subsequent to the capture of the series of images.

4. The method according to claim 3, wherein the recurrent convolutional neural network is of the Long Short-Term Memory type, LSTM.

5. The method according to claim 1, wherein the recurrent non-convolutional neural network is of the Long Short-Term Memory type, LSTM.

6. The method according to claim 1, wherein the image obtained from the wide-angle image capture device is obtained by:
   application of an optical flow algorithm to the captured series of images in order to predict said obtained image, the obtained image corresponding to a time t subsequent to the captured series of images.

7. The method according to claim 1, wherein the image obtained from the wide-angle image capture device is obtained by:
   processing of the series of images by another convolutional neural network in order to predict said obtained image, the obtained image corresponding to a time t subsequent to the captured series of images.

8. The method according to claim 1, wherein the processing by the convolutional neural network comprises at least:
   a first layer for the application of convolution filters;
   a second layer for downsampling the output from the first layer.

9. The method according to claim 8, wherein the processing by the convolutional neural network comprises several pairs of successive first and second layers.

10. The method according to claim 8, wherein the layer for estimating the energy production indicator comprises processing by a neuron followed by application of a linear activation function.

11. The method according to claim 1, wherein the at least one energy production indicator comprises one of, or a combination of:
    a global horizontal irradiance parameter;
    a diffuse horizontal irradiance parameter; or
    a direct normal irradiance parameter.

12. An estimation device for estimating at least one energy production indicator of a solar energy production system, comprising:
    a reception interface for receiving at least one image obtained from a wide-angle image capture device, wherein a series of images is obtained from the wide-angle image capture device,
    a processor configured for the processing of said captured image by at least one convolutional neural network comprising at least two layers respectively for the application of a convolution filter to said obtained image and for the estimation of an energy production indicator;
    wherein the processor is configured to process the images of the series in a first processing by a recurrent convolutional neural network in order to obtain a context vector, said context vector being subjected to a second processing by a recurrent non-convolutional neural network in order to obtain the energy production indicator;
    wherein the application of the convolution filter is implemented in the recurrent convolutional neural network and the estimation of the energy production indicator is implemented in the recurrent non-convolutional neural network.

13. A system comprising a wide-angle image capture device capable of communicating with the estimation device according to claim 12.

14. The method according to claim 4, wherein the recurrent non-convolutional neural network is of the Long Short-Term Memory type, LSTM.

* * * * *